United States Patent [19]

van der Lely et al.

[11] 4,300,364
[45] Nov. 17, 1981

[54] OVERLOAD COUPLINGS

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 74,546

[22] Filed: Sep. 11, 1979

Related U.S. Application Data

[62] Division of Ser. No. 872,545, Jan. 26, 1978, Pat. No. 4,199,963.

[30] Foreign Application Priority Data

Feb. 1, 1977 [NL] Netherlands .......................... 7701012

[51] Int. Cl.³ .............................................. F16D 3/56
[52] U.S. Cl. .................................. 64/28 R; 192/56 R
[58] Field of Search ................ 64/28 R, 29; 192/56 R

[56] References Cited

U.S. PATENT DOCUMENTS

| | | | |
|---|---|---|---|
| 1,740,617 | 12/1929 | Morgan | 64/28 R |
| 1,740,838 | 12/1929 | Roesen | 64/28 R |
| 1,778,477 | 10/1930 | Wood | 64/28 R |
| 2,388,186 | 10/1945 | Rowsey | 64/28 R |
| 3,049,898 | 8/1962 | Voth | 64/28 R |
| 3,855,818 | 12/1974 | Hochreuter | 64/29 |

Primary Examiner—Charles J. Myhre
Assistant Examiner—Magdalen Moy
Attorney, Agent, or Firm—William B. Mason

[57] ABSTRACT

An overload coupling includes two members that are interconnected by at least one shear pin for rotation about a common axis. The pin is normally urged in a direction parallel to the axis through an aperture of the second member into an opening of the first member, the interface between the two members forming a cutting structure. Upon being fractured, the severed portion drops out of the opening and a spring mechanism that bears on the remainder of the pin, urges same into the opening to re-establish interconnection between the two members. The size of the opening and/or pressure of the spring are preferably selected to allow reconnect only when the relative rotation between the two members drops so that reconnect while automatic, is deliberate. The spring can be part of an assembly that is configured to exert the desired pressure on the pin to ensure such reconnect. A plurality of pins can be mounted in one or more holders releasably attached to the coupling.

12 Claims, 15 Drawing Figures

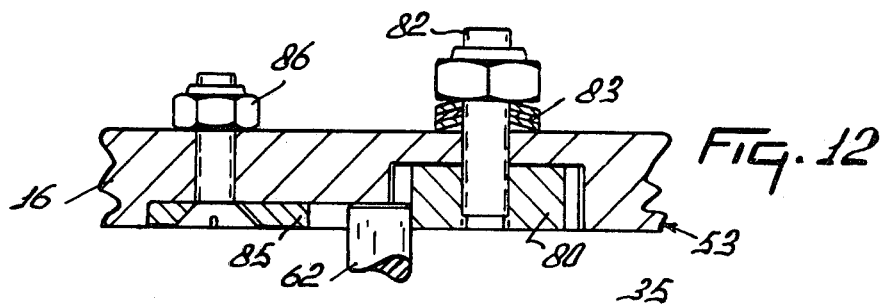
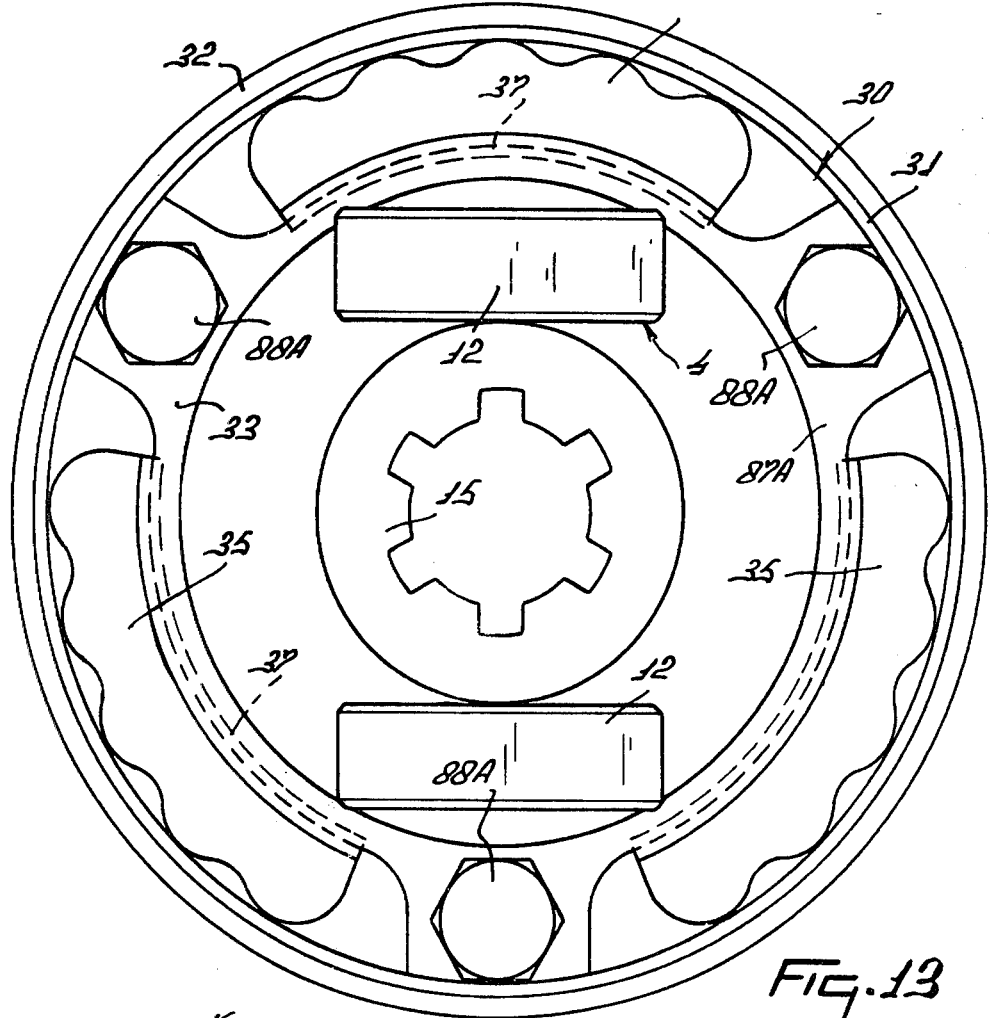
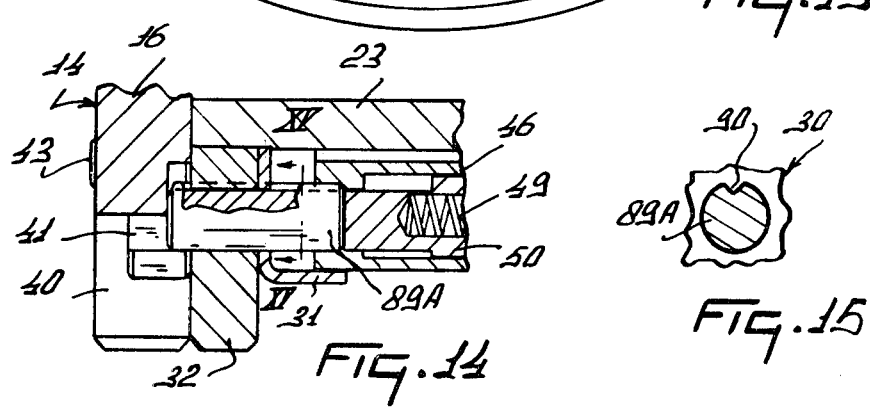

OVERLOAD COUPLINGS

This application is a Rule 60 division of Ser. No. 872,545 filed Jan. 26, 1978 now U.S. Pat. No. 4,199,963.

This invention relates to overload couplings.

According to one aspect of the present invention there is provided an overload coupling having a first coupling member and a second coupling member, and a frangible pin inter-connecting the first coupling member and the second coupling member for rotation together in normal operation, the coupling further comprising means for moving the frangible pin, after fracture of the frangible pin, to re-establish the interconnection of the coupling members.

According to another aspect of the present invention there is provided an overload coupling including a spring-loaded frangible pin the spring having a smaller diameter at the end adjacent the frangible pin than at the end remote from the frangible pin.

The present invention also provides a drive shaft assembly including a coupling as defined above, and a holder for one or more frangible pins for use with a coupling as defined above.

For a better understanding of the present invention and to show how it may be carried into effect, reference will now be made, by way of example only, to the accompanying drawings, in which:

FIG. 12 is a sectional view taken on the lines XII—XII in FIG. 11;

FIG. 13 is an elevational view of a fourth embodiment of the coupling;

FIG. 14 is a sectional view of part of a fifth embodiment of the coupling; and

FIG. 15 is a sectional view taken on the lines XV—XV in FIG. 14.

Figure 1:
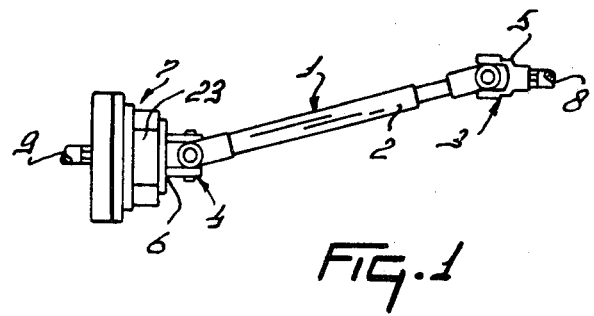
FIG. 1 is an elevational view of a drive shaft assembly provided with an overload coupling.
Figure 2:
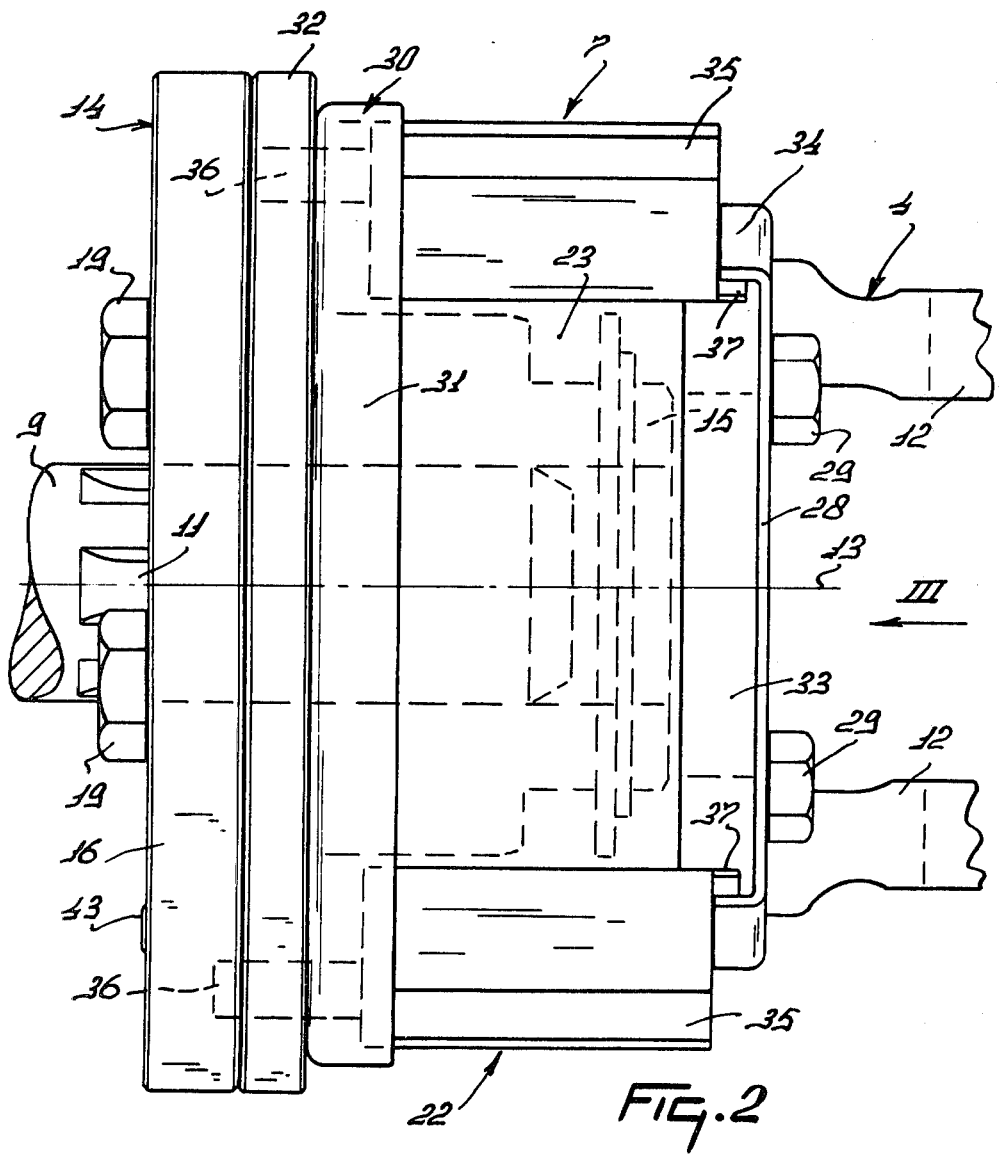
FIG. 2 is an enlarged elevational view of an end portion of the assembly of FIG. 1, showing the overload coupling.
Figure 3:
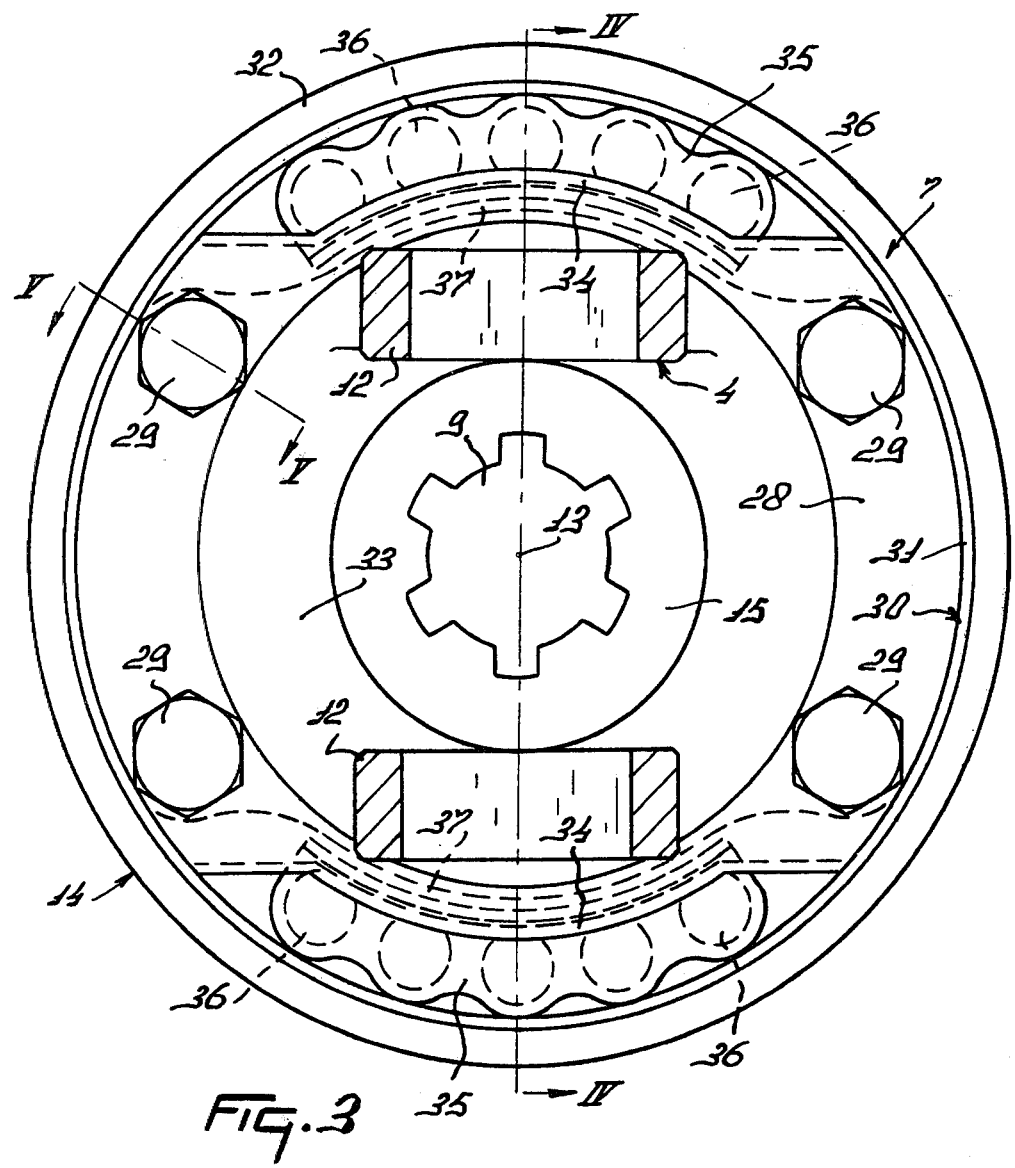
FIG. 3 is an elevational view of the coupling taken in the direction of the arrow III in FIG. 2.
Figure 5:
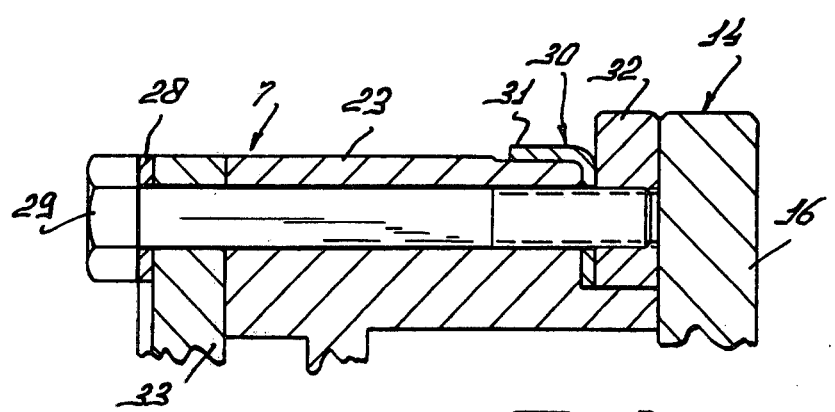
FIG. 5 is a sectional view of part of the coupling taken on the lines V—V in FIG. 3.
Figure 4:
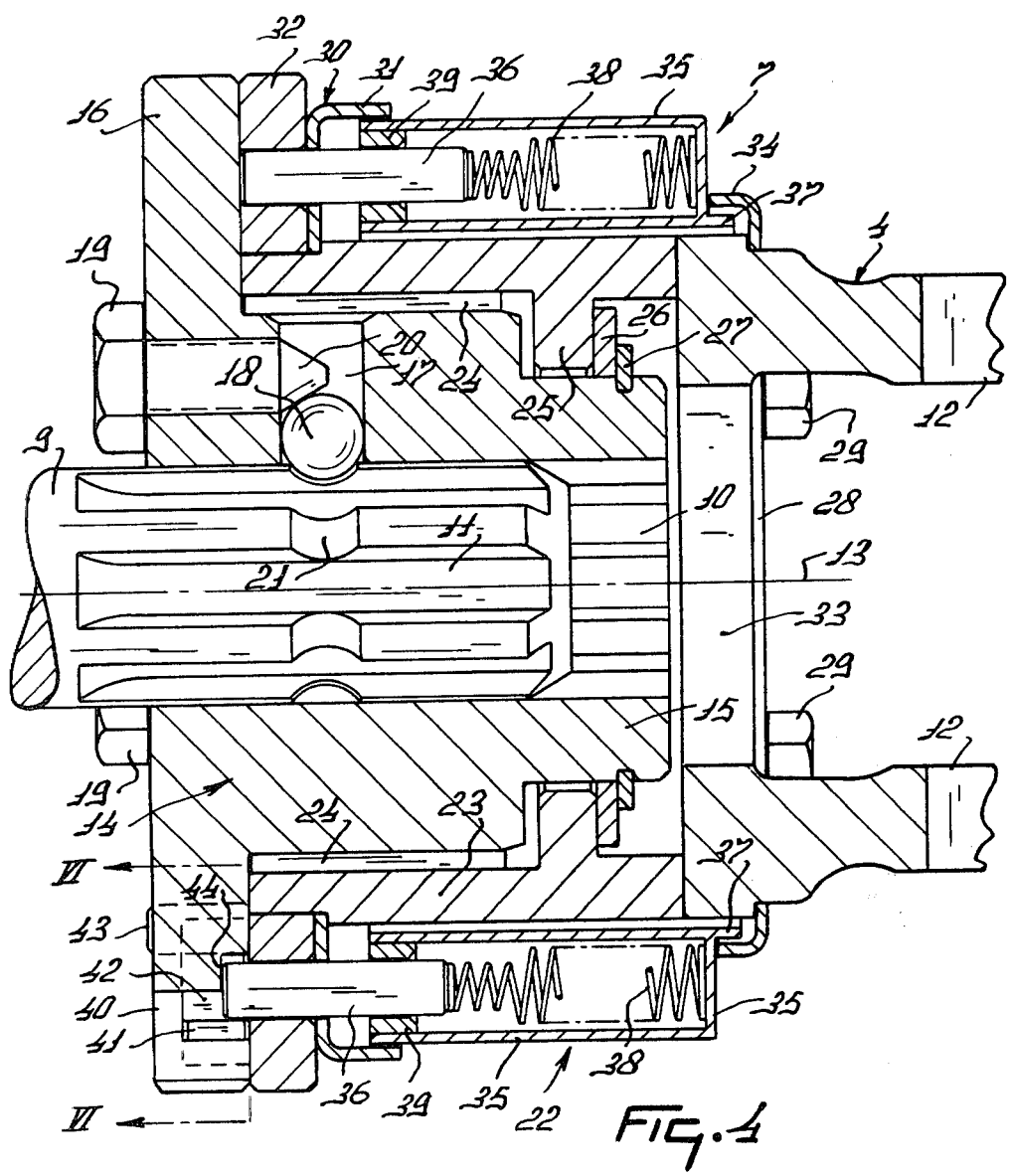
FIG. 4 is a sectional view of the coupling taken on the lines IV—IV in FIG. 3.

The driving or intermediate shaft 1 shown in FIG. 1 comprises a two-part telescopic main portion 2 which is pivoted at one end by means of a universal coupling 3 to an end portion 5. The other end of the main portion 2 is connected to an end portion 6 by a universal coupling 4. The end portion 6 comprises an overload, or shear pin, coupling 7. The end portion 5 is hollow over part of its length and has splines which co-operate with corresponding splines on the outer periphery of a stub shaft 8. Near the shear pin coupling 7 the end portion 6 is provided in a similar manner with axial splines 10 (FIG. 4) which co-operate with splines 11 on the outer periphery of a power take-off shaft 9. The power take-off shaft 9 constitutes a driving shaft and is, for example, the power take-off shaft of an agricultural tractor, while the stub shaft 8 constitutes an input shaft of, for example, an agricultural implement such as a soil cultivating machine.

Since the shear pin coupling 7 is a substantially symmetrical structure, only one half of the coupling will be described. The plane of symmetry is located between the two fork limbs 12 of the universal coupling 4 and contains the rotary axis 13 of the end portion 6 and also of the shear pin coupling 7. The coupling 7 comprises a first coupling member 14 having a hub 15, and a second coupling member 22. The hub 15 has the splines 10 on its inner side. Near the universal coupling 4, the hub 15 has a smaller outer diameter than it has at a distance from the coupling 4. The end of the hub 15 remote from the coupling 4 is connected with a radially extending coupling plate 16; the inner diameter of the hub 15 is about 20 to 30%, preferably about 24%, of the outer diameter of the circular plate 16. The hub 15 has a radial bore 17 receiving a ball 18. The ball 18 is radially movable with respect to the rotary axis 13, but this movement can be limited or prevented by a retaining means which includes a part in the form of a bolt 19. The bolt 19 has a conical end portion 20, which is adapted to co-operate with the ball 18. Thus axial movement of the guard bolt 9 serves to retain the ball 18 in an annular recess 21 in the end portion of the take-off shaft 9 to lock the coupling on the shaft.

The second coupling member 22 is connected with the fork limbs 12. The coupling member 22 comprises a carrier 23 arranged, coaxially with the rotary axis 13, between the coupling plate 16 and the fork 12. The carrier 23 is journalled on the hub 15 by a needle bearing 24. The bearing 24 is provided on the part of the hub 15 having an enlarged diameter. Near the fork 12 the carrier 23 is provided with an inner ring 25 which bears, on the side facing the fork 12, on a thrust ring 26 which surrounds the hub 15 and is held between the ring 25 and a retaining ring 27. The retaining ring 27 is received in a groove in the hub 15. The retaining ring 27 fixes the two coupling members 14 and 22 together in the axial direction. The fork 12 is connected with the carrier 23 by means of a retaining plate 28 and four bolts 29. The bolts 29 extend parallel to the rotary axis 13 for substantially the whole length of the carrier 23. Near the end of the carrier 23 facing the coupling member 14 there is a centering plate 30 having a portion 31 extending substantially parallel to the rotary axis 14. The bolts 29 extend through the centering plate 30 and are screwed into an internal screw-thread of a cutting ring 32. By tightening the bolts 29 the parts of the coupling member 22 can be fixed in place relatively to each other. One side of the cutting ring 32 engages the coupling plate 16 and the outer diameter of the cutting ring 32 is approximately equal to the outer diameter of the plate 16. The cutting ring 32 is preferably made from the hardened material, for example, 16MnCr$_5$ steel. The retaining plate 28 is fixed by means of the bolts 29 to a fastening part 33 of the fork 12. The retaining plate 28 has, as viewed in an axial direction, a smaller radial dimension in the regions of the fork limbs 12 than elsewhere around its circumference, and has retaining rims 34 which are bent over at right angles to the rest of the plate and are each located approximately between two of the bolts 29. The rims 34 extend coaxially with the rotary axis 13 and are at a greater distance from the rotary axis 13 than is the outer surface of the carrier 23. In between the rims 34 and the portion 31, which forms a second retaining rim, are slipped two holders 35 each containing five frangible shear pins 36 which are preferably made from 34Cr$_4$ steel. Each holder 35 has a corrugated shaped outer wall, viewed along the rotary axis 13, whereas its inner wall is arcuate and coaxial with the rotary axis 13, the inner wall engaging the outer wall of the carrier 23. The inner wall of each holder 35 has a projection or lug 37 which projects towards the fork 12 and is clamped beneath the rim 34. At the end nearer the coupling member 14, each holder 35 is clamped underneath the portion 31. The shear pins 36 are pushed by a spring 38 towards the first coupling member 14, the shear pins 36 being guided in a sleeve 39. The sleeve 39 has a bevelled edge at the end nearer the spring 38 (FIG. 4) and it serves, in addition, for closing the holder 35. The spring 38 has one portion comprising about 5 to 6 coils having a diameter of about 10 to 11 mms and has another portion, which is in engagement with the pin 36, comprising 3 to 5 coils having a diameter of about 6 to 6.5 mms. On either side of the rotary axis 13 the centering plate 30 and the cutting ring 32 have five openings having a diameter corresponding with the diameter of the shear pins 36. The springs 38 push the shear pins 36 through these openings against the coupling plate 16.

Figure 6:
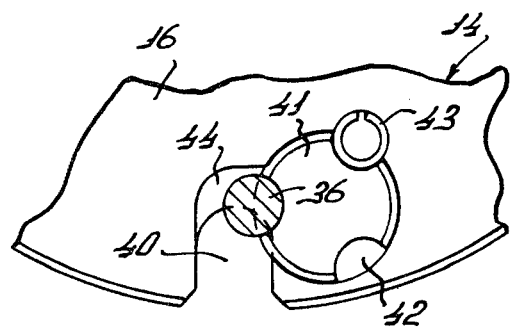
FIG. 6 is a sectional view of part of the coupling taken on the lines VI—VI in FIG. 4.
Figure 10:
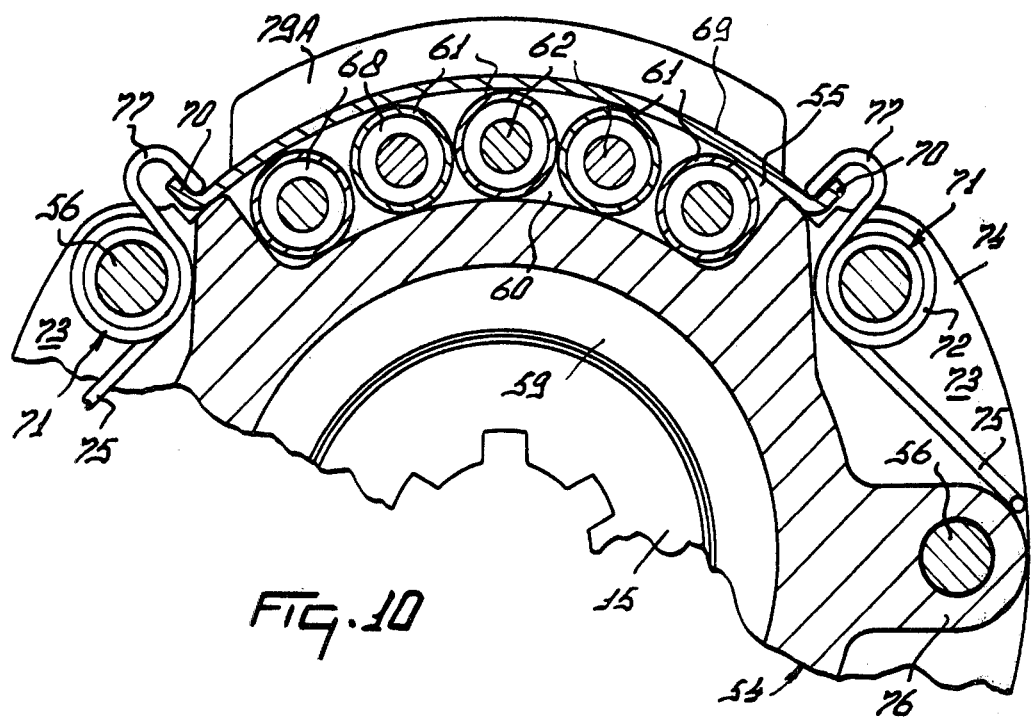
FIG. 10 is a sectional view of part of the coupling taken on the lines X—X in FIG. 9.

The coupling plate 16 has an aperture 40 having a channel extending radially to the outer periphery of the coupling plate. The precise width of the channel depends on the diameter of the shear pin 36, but is about 10 to 20 mms. It is highly important that the distance between the shear pin 36 in the aperture and the opposite edge of the aperture should be about 50 to 70% of the diameter of the shear pin. In order to support the shear pin effectively and to break it off in the event of overload a substantially circular cutting plate 41, preferably of hardened material such as 16MnCr$_5$ steel, is disposed on one side of the aperture 40. The diameter of this cutting plate is about 20 to 30 mms; in the embodiment of FIG. 6 it is about 22 mms. There are three circular cavities 42 at the circumference of the cutting plate for supporting the shear pin. The cutting plate 41 is fixed in position in the coupling plate by a securing pin 43. Viewed in an axial direction the shear pin 36 is supported in the aperture 40 by a ledge 44 of the aperture 40, this ledge 44 supporting the shear pin over about half its head area. The remaining area of the free end of the shear pin 36 is not supported, since radially outwardly of the edge of the ledge 44 the aperture 40 is completely open in an axial direction.

Before the driving shaft is put into operation, the two shear pin holders or cassettes 35 are fitted in place. The holders 35 may be delivered to the user by the manufacturer ready for use and provided with shear pins 36, but alternatively the user can fill the holders 35 with shear pins. In order to fix the shear pins in the holder 35 a retaining member formed by a draw pin 45 is passed through the end of the holder remote from the spring 38 (FIG. 7), this draw pin lying perpendicular to the longitudinal axis of the shear pins.

The holders 35 are fitted in place by first slipping the holder between the retaining rim 31 and the outer wall of the carrier 23 and by subsequently sliding the holder in the opposite sense until the lug 37 snaps in between the retaining rim 34 and the fastening part 33. The draw pin 45 can then be withdrawn from the holder so that the action of the springs 38 on the shear pins and hence on the first coupling half 14 automatically retains the holder between the retaining rims 31 and 34. The centering plate 30 engages the holder 35 in such a way that, when the draw pin 45 is withdrawn, the pins 36 slip automatically into the openings of the cutting ring 32. In this manner the retaining rims 31 and 34 together with the lug 37 co-operate to provide a quick-action connection for the holder 35 under the action of the spring 38. By a turning the two coupling members 14 and 22 relatively to each other, one of the shear pins will click into the opening 40 to interconnect the two coupling members. After the power take-off shaft 9 has been secured with the shear pin coupling by the retaining bolt 19 and the ball 18 and after the end portion 5 has been connected with the stub shaft 8, the driving shaft 1 is ready for use.

If the operation of the implement connected with the stub shaft 8 is obstructed in some way and there is consequently a danger that the implement and the driving shaft 1 will be overloaded, the portion of the shear pin 36 located in the opening 40 will break off. The supporting ring 32 and the cutting plate 41 ensure a clean cut of the pin 36 so that the new free end of the shear pin 36 has a smooth surface. Because hardened material is used for the cutting plate 41 and the supporting ring 32, damage of the further parts of the coupling member 14 and 22 is avoided. The broken-off fragment of the shear pin 36 is ejected in a radial and, as in some cases, axial, direction owing to the shape of the opening 40, so that the opening is cleared very quickly. Since the two coupling members are rotatable relatively to one another due to the bearing 24, and since the two coupling members are held together axially by the retaining ring 27, the two coupling members can rotate freely with respect to one another after fracture of the pin. Owing to the critical tangential magnitude of the opening 40, re-interconnection of the two coupling members, that is to say, resetting of the shear pin 36 in a connecting position, can only be performed at a lower speed than stalling speed of the power take-off shaft. This means that the power take-off shaft has to be intentionally disconnected before the shear pin coupling can be re-connected. The tangential magnitude of the opening 40 is determined by the time factor T in the formula $S = \frac{1}{2}AT^2$, in which S represents the distance by which the pin must advance towards the opening 40 to establish the connection between the two coupling members. During use the terms A and T are approximately constant for each pin diameter. In order to maintain the term A constant, the pressure applied by the spring 38 has to be proportional to the length of the pin 36. In this way the shear pin coupling can be re-connected automatically. Since the pins 36, when new, have a length of, preferably, about 30 to 60 cms, they can break off many times, and so they can be used for a long period for repeatedly re-connecting the two coupling members. Because there is a plurality of cavities 42 in the cutting plate 41, this plate can be set in a new position when one cavity 42 become worn or otherwise defective, so that a new cavity 42 can be used for engaging the shear pin in the connecting position. The coupling can be adjusted for the transmission of higher or lower power by using holders 35 with correspondingly stronger or weaker shear pins and by replacing the cutting ring 32 and the centering plate 30 by others having apertures of the right size for the shear pins. The design of the spring 38 is highly important for ensuring the correct re-connecting effect of the shear pin 36 as described above. It is also very advantageous that the diameter of the spring at the end which engages the shear pin is smaller than at the other end. Because of this feature, the spring 38 can push the shear pin 36 through the guide sleeve 39 to increase the number of times which the pins 36 can break off.

Figure 8:
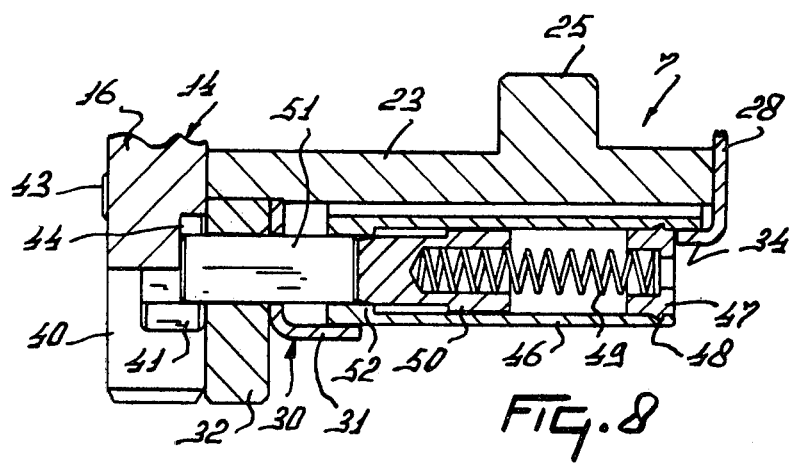
FIG. 8 is a sectional view of part of a second embodiment of a coupling corresponding to the part shown in FIG. 4.
Figure 9:
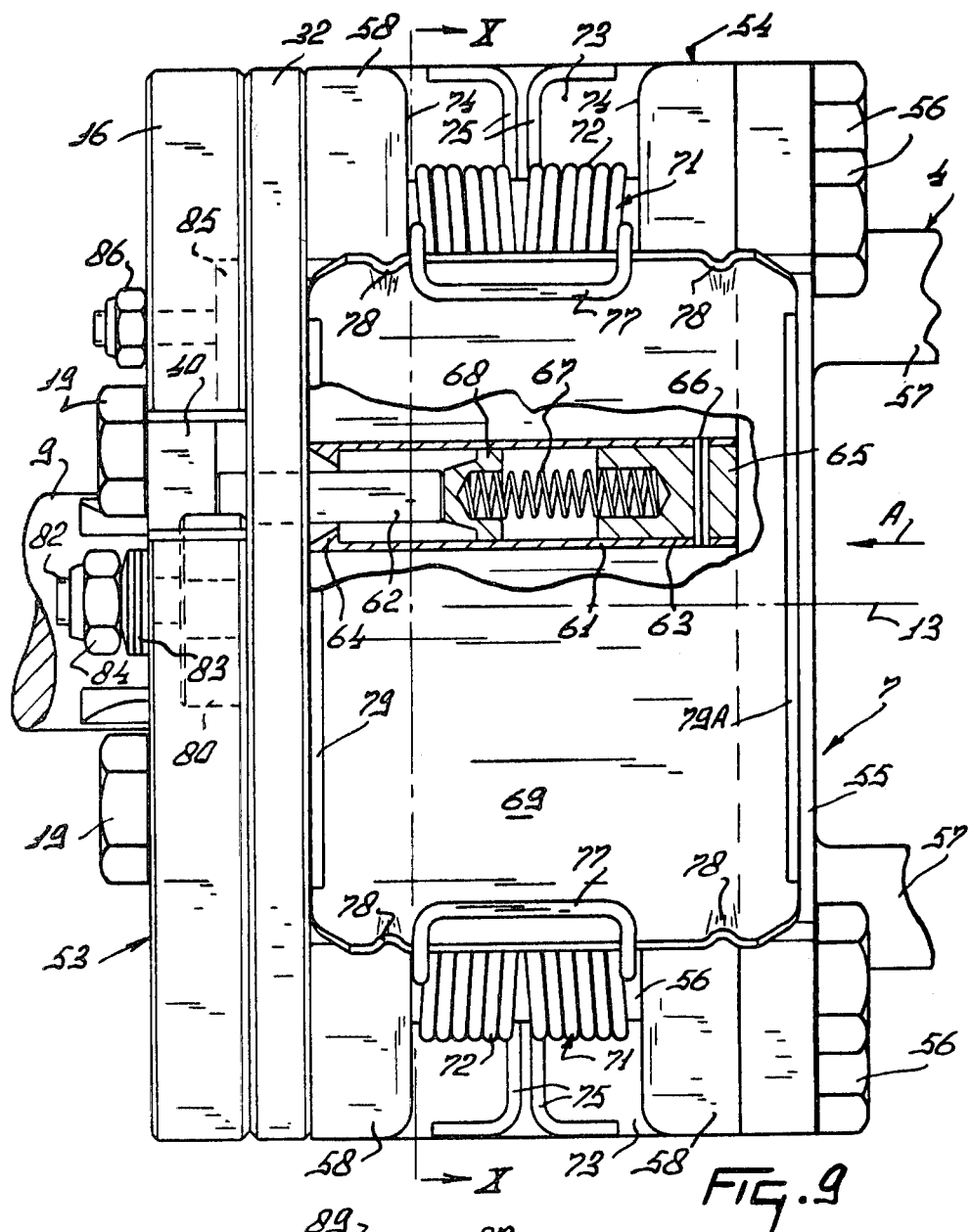
FIG. 9 is an elevational view of a third embodiment of the coupling.

FIG. 8 shows an embodiment of a holder or cassette 46 which can be used in the coupling 7 of the preceding Figures. The holder 46 has an external sheath substantially similar to that of the holder 35. At the top the holder is closed by means of a closing cap 47. There may be a separate closing cap 47 for each pin, but alternatively the closing caps may be united to form an uninterrupted closing cover for all of the shear pins in the holder. The closing cap is preferably made from a synthetic material and has a partly annular rib 48 for fixing the closing cap 47 in the inner wall of the holder 46. The closing cap 37 has a cavity which receives one end of a compression spring 49 providing a force approximately the same as that of the spring 38 of the first embodiment. The end of the spring 49 remote from the cap 47 is received in a cavity provided in a plunger 50. The plunger 50 pushes home the shear pin 51. In order to guide the plunger 50 the holder 46 has rigidly secured to it a guide sleeve 52. In order to allow a displacement of the plunger 50 over a sufficient distance through the sleeve 52, its diameter over about 60% of its length is smaller than that over the rest of its length. The plunger 50 may be made of a synthetic substance, so that a smooth displacement along the wall of the holder 46 is ensured, but it has been found to be advantageous to make the pressure pin 50 from fairly heavy material in order to resist to some extent undesirable tilting or jerking movements of the shear pin 51. The holder 46 can be filled in a very simple manner with shear pins 52, while with this construction each shear pin 52 is satisfactorily and uniformly acted upon over the whole of the surface of its free end. The smaller diameter portion of the plunger 50 means that the shear pin can be pressed home to near the aperture in the cutting ring 32. The residual portion of the breaking pin, which can finally no longer be utilized, is thus minimized.

FIGS. 9 to 12 show a third embodiment of a shear pin coupling 7. Parts corresponding with those of the preceding Figures are designated by the same reference numerals. A first coupling member 53 comprises, as before, the coupling plate 16 and the hub 15. By means of the retaining ring 27 shown in FIG. 4, the first coupling member 53 is secured in the axial direction to a second coupling member 54. The second coupling member 54 is connected, preferably by six bolts 56, with a fastening part 55, which comprises a substantially circular plate connected with fork limbs 57 of the universal joint 4. To the fastening part 55 is secured a carrier 58, the function of which is comparable to that of the carrier 23 of FIG. 4. The carrier 58 is disposed between the fastening part 55 and the cutting ring 32. As shown in the sectional view of FIG. 20 the carrier 58 comprises an inner ring 59 similar to the inner ring 25 in FIG. 4, for fixing the carrier in place with respect to the first coupling member 53. The carrier 58 has two cavities or recesses 60, positioned diametrically opposite each other with respect to the rotary axis 13, for holding a plurality of shear pin holders. Each cavity preferably comprises 5 cylindrical holders 61 each containing a shear pin 62. Each holder 61 comprises a tube 63 having a diameter of about 16 mms. The tubes 63 may be made of a synthetic material such as plastics. Alternatively, the tubes 63 may be made from metal. Each tube 63 covers the whole axial distance between the fastening plate 55 and the cutting ring 32. Near the cutting ring 32 the tube is provided with a tapering inner ring 64. The smaller diameter part of this ring 64 constitutes a guide for the shear pin 62. The tube 63 is closed at its end nearer the fastening plate 55 by a plug or cap 65, which is rigidly secured to the tube 63 by means of a tensile pin 66. The plug 65, which is preferably made from a synthetic substance, has a cavity, on the side facing the interior of the tube 63, receiving one end of a compression spring 67. The compression spring 67 approximately corresponds with the spring 49 of FIG. 8. At its end remote from the plug 65, the spring 67 is received in a plunger 68, one end of which is substantially in full engagement with the free end of the shear pin 62. The plunger has a portion of enlarged diameter which engages the inner wall of the tube 63. The plunger 68 may have a fairly considerable mass to avoid tilting or jerking of the shear pin 62. The shear pins and their holders 61 are retained in the cavity 60 by a sliding cover 69. The sliding cover 69 has an arcuate shape centered on the rotary axis 13 and has on two sides axially bent-over rims 70. The rims 70 co-operate with clamping springs 71. Each clamping spring 71 has several turns 72 surrounding one of the bolts 57 and is arranged in a recess 73 in the carrier 58. The recess 73 is completely open in a radially outward direction and is bounded on each end, as viewed axially, by walls 74 of the carrier 58. The clamping spring 71 has an end portion 75, extending away from the cavity 60, which is in engagement with a radially extending bulging part 76 of the carrier 58 surrounding a bolt 56; this bulging part 76 separates two adjacent recesses 73 from one another. The spring 71 also has a portion 77 bent over through about 180°. The free end of this portion 77 presses the adjacent end portion of the bent-over rim 70 towards the rotary axis 13. As shown in the elevational view of FIG. 9, the bent-over portion 77, comprising two limbs interconnected by a web, bears by one of the limbs on a locally pressed out part of the rim 70. The sliding cover 69 has a second pressed out part 78 on the other side of the clamping spring 71 so that the cover 69 can be slid, by means of bent-over sides 79 or 79A, in the direction of the arrow A across the cavity 60.

In this embodiment the coupling plate 16 also has an opening 40 for receiving a shear pin 62 in a connecting position. In order to support the shear pin 62, a cutting plate 80 is recessed into the plate 16, this cutting plate 80, like the plate 41, being made from hardened material. The cutting plate 80 has at its circumference four cavities 81 for receiving the portion of the shear pin 62 projecting into the opening 40. The cavities 81 (see FIG. 1) are arcuate with a radius of about 6 mms. The cutting plate 80 is rigidly secured to the plate 16 by means of a bolt 82, which is fixed in place on the side of the plate 16 remote from the second coupling member 54 by a self-locking nut acting on one or more cup springs 83. On the one side of the opening 40 remote from the cutting plate 80 the plate 16 has a recess for receiving a filling plate 85. The filling plate 85 is fixed to the plate 16 by a bolt and a nut 86. On the basis of the dimension indicated by 87 in FIG. 11 being 16 mms, the filing plate 85 has the sizes 88 and 89 as follows:

| Diameter of shear pin (mm) | Dimension 88 (mm) | Dimension 89 (mm) |
| --- | --- | --- |
| 7 | 20.0 | 28.0 |
| 8 | 18.5 | 26.5 |
| 10 | 15.5 | 23.5 |

The construction shown in FIGS. 9 to 12 operates as follows.

Figure 7:
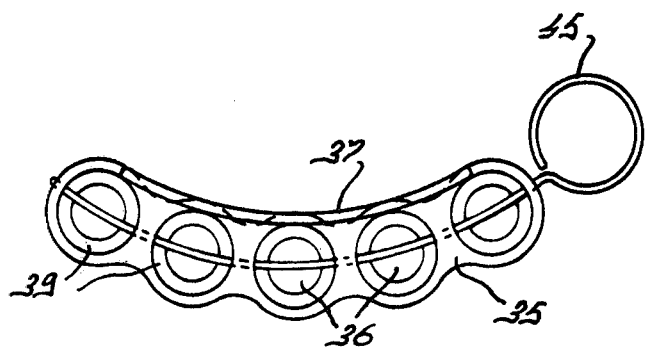
FIG. 7 shows a holder with frangible pins suitable for use in the coupling shown in FIGS. 1 to 6.
Figure 11:
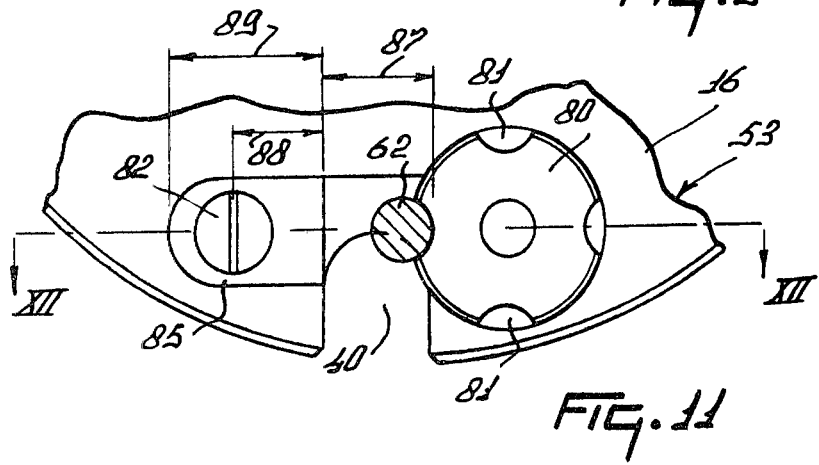
FIG. 11 is an elevational view of part of the coupling shown in FIG. 9.

With the cover 69 removed, the cavity 60 of the shear pin coupling 7 can be filled with shear pin holders 61 having each a shear pin 62. In order to facilitate this operation a draw pin as shown in FIG. 7 may be used. The holders 61 are simple of construction and hence quite cheap so that the user can keep a supply of spare holders in stock. When the cover 69 is slid across the cavity 60 and thus the rim 70 is clamped tightly beneath the bent-over part 70, the cover 69 is retained in place by the engagement of the pressed out part 78 with the portion 77. The bent-over sides 79 and 79A facilitate the positioning of the cover 69. The further operation of the coupling corresponds with the operation described for the preceding embodiments. After rupture of the shear pin located in the opening 40 the speed of the power take-off shaft has first to be reduced as in the preceding embodiments. In the present embodiment the factor T of the formula $S = \frac{1}{2}AT^2$, which factor is, in fact, determined by the diameter of the pin and the associated tangential magnitude 87 for the opening 40, can be kept constant with various diameters of the pin, since filling plates 85 of different dimensions 88 and 89 can be used in dependence upon the diameter of the pin. As shown in FIG. 11, the cutting plate 80 is adjustable by simply turning it about the bolt 82 to present a different cavity 81 in the opening 40 so that after any damage of one cavity 81 the cutting plate 80 can be readily moved to present a new cavity 81. The cup springs 83 absorb shocks on the plate 80.

FIG. 13 shows a further embodiment of shear pin coupling 7, in which three holders 35 are disposed between the retaining rim 31 and a slightly matching retaining rim 87A. The retaining rim 87A clamps the fastening part 33 and the fork limbs 12 with the carrier 23 tightly against the cutting ring 32 by means of bolts 88A. The three holders 35 further raise the capacity of the coupling 7, which can thus be used for even a longer time without needing to replace shear pins than in the preceding embodiments.

FIGS. 14 and 15 show an alternative form of the embodiment shown in FIG. 8, in which a shear pin 89A has a groove 90 extending over its whole length and parallel to its longitudinal center line. This groove 90 co-operates with corresponding lugs on the guide sleeve 52, the centering plate 30 and the cutting rings 32. It has been found to be advantageous to located the breaking pin so as to be non-rotatable in the opening 40. This is ensured by the groove 90 and the corresponding lugs on the further parts of the coupling. It is thus ensured that, when the shear pin portion located in the opening 40 breaks off, the cutting effect on the breaking pin is minimized, so that a sharply defined breaking surface is formed each time, which enhances the disturbance-free use of the pin 89A for a long time. This shape for the breaking pin 89A is highly advantageous for the multi-rupture shear pin used in the holders described above.

While various features of the coupling that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An overload coupling comprising a first member and a second member that are drivenly interconnected by frangible means for rotation together about a common axis during normal operation, said frangible means comprising at least one frangible pin that interconnects the coupling members, said pin being fitted in cutting means positioned to sever the pin upon overload and permit relative rotation between said members, means urging said frangible means into said cutting means to re-establish a driving interconnection between said coupling members, said cutting means comprising an aperture in said first member that receives a severable portion of the pin and said portion establishing driving interconnection between said members, means adjusting the size of said aperture, whereby different pins of different diameter are accommodated in said aperture.

2. An overload coupling as claimed in claim 1, wherein a filling plate is releasably secured to said coupling and said plate reduces the tangential magnitude of said aperture a predetermined amount.

3. An overload coupling as claimed in claim 2, in which said tangential magnitude is about 20% to 60% of the diameter of the frangible pin.

4. An overload coupling as claimed in claim 1 in which the axial dimension of said aperture increases in a radially outward direction.

5. An overload coupling comprising a first member and a second member that are drivenly interconnected by frangible means for rotation together about a common axis during normal operation, said frangible means comprising at least one frangible pin that interconnects the coupling members and said pin being fitted in cutting means positioned to sever the pin upon overload and permit relative rotation between said members, said pin being elongated and extending in the direction of rotation of the coupling through opening means in the second member and into an aperture of said first member, a compression spring urging the remainder of the pin into the aperture following fracture of a portion thereof, said cutting means being located adjacent both said opening means and the aperture, said spring applying a predetermined pressure on the pin that is proportional to the length of said pin, said aperture having a critical tangential magnitude that accepts the pressured pin only at a predetermined reduced rotational speed of said first member relative to said second member.

6. An overload coupling as claimed in claim 5, in which the spring exerts a constant force that decreases proportionally to the decrease in length of the pin, said pin being slideably held in a holder attached to said second member.

7. An overload coupling as claimed in claim 6, wherein said first member comprises means adjusting the tangential magnitude of said aperture to match said speed of rotation.

8. An overload coupling comprising a first member and a second member that are drivenly interconnected by frangible means for rotation together about a common axis during normal operation, said frangible means comprising at least one frangible pin that interconnects the coupling members and said pin being fitted in cutting means that severs the pin upon overload and permits relative rotation between said members, means including at least one elongated compression spring assembly urging said pin through opening means in said second member and into an aperture in said first member to re-establish an interconnection in said cutting means between the two coupling members, one end of said assembly being positioned to bear on an outer end of the pin and said one end being reduced in size relative to an adjacent assembly portion, said assembly being slideably housed in a holder and said holder having an internal sleeve that guides said pin.

9. An overload coupling as claimed in claim 8, in which said assembly includes a plunger that engages said outer pin end.

10. An overload coupling as claimed in claim 9, in which said plunger is slideably housed within said holder and a spring is fitted between the plunger and a closing cap of the holder.

11. An overload coupling as claimed in claim 8, in which a compression spring bears directly on the outer pin end and the diameter of the spring part that bears on the pin has about the same diameter as the pin.

12. An overload coupling as claimed in claim 8, in which there are at least two holders releasably connected to the coupling and each holder houses at least one frangible pin.

* * * * *